(12) United States Patent
Goldhamer

(10) Patent No.: US 9,473,982 B2
(45) Date of Patent: Oct. 18, 2016

(54) UTILIZATION OF THE UPLINK FDD CHANNEL

(71) Applicant: Mariana Goldhamer, Ramat Gan (IL)

(72) Inventor: Mariana Goldhamer, Ramat Gan (IL)

(*) Notice: Subject to any disclaimer, the term of this patent is extended or adjusted under 35 U.S.C. 154(b) by 226 days.

(21) Appl. No.: 14/383,588

(22) PCT Filed: Oct. 20, 2013

(86) PCT No.: PCT/IB2013/059481
§ 371 (c)(1),
(2) Date: Sep. 8, 2014

(87) PCT Pub. No.: WO2014/061001
PCT Pub. Date: Apr. 24, 2014

(65) Prior Publication Data
US 2015/0109932 A1    Apr. 23, 2015

Related U.S. Application Data

(60) Provisional application No. 61/882,792, filed on Sep. 26, 2013.

(30) Foreign Application Priority Data

Oct. 21, 2012   (IL) ............................................ 222597

(51) Int. Cl.
*H04W 28/08* (2009.01)
*H04W 72/04* (2009.01)
(Continued)

(52) U.S. Cl.
CPC .......... *H04W 28/085* (2013.01); *H04L 5/1438* (2013.01); *H04W 72/042* (2013.01); *H04W 72/0446* (2013.01); *H04W 72/0453* (2013.01); *H04W 72/082* (2013.01)

(58) Field of Classification Search
None
See application file for complete search history.

(56) References Cited

U.S. PATENT DOCUMENTS

| 6,859,655 B2 * | 2/2005 | Struhsaker .......... H04B 7/2615 370/319 |
| 8,280,385 B2 | 10/2012 | Jones et al. |
| 2012/0063373 A1 | 3/2012 | Chincholi et al. |

(Continued)

OTHER PUBLICATIONS

Elena Costa and All, IST-2003-507581 WINNER, D2.5 v1.1, Duplex arrangements for future broadband radio interfaces, Oct. 30, 2004, Table 2-1.

(Continued)

*Primary Examiner* — Kenny Lin

(57) ABSTRACT

A method for communication, includes communicating over the air with user equipment (UE) (304, 305) in a frequency domain duplexing (FDD) mode, which defines a downlink channel comprising a first set of time frequency resources in a first frequency range and an uplink channel comprising a second set of time-frequency resources, comprising multiple physical resource blocks (PRBs) in multiple time periods, in a second frequency range, which has two channel edges and is disjoint from the first frequency range. An excess capacity is identified in the uplink channel, and at a least a portion of the excess capacity is allocated for downlink communication by assigning a subset of the time-frequency resources in the second frequency range to the downlink communication, wherein the subset does not comprise at least the PRBs at both of the channel edges in at least one of the time periods. The method includes communicating over the air with at least one UE by transmitting downlink information using the assigned subset of the time-frequency resources in the second frequency range.

25 Claims, 9 Drawing Sheets

Figure 1:
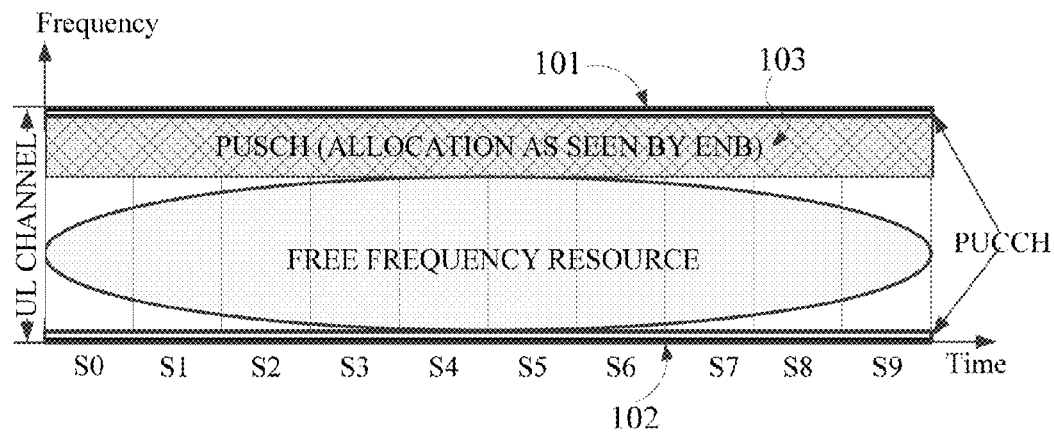

(51) Int. Cl.
    *H04L 5/14* (2006.01)
    *H04W 72/08* (2009.01)

(56) References Cited

U.S. PATENT DOCUMENTS

| | | | |
|---|---|---|---|
| 2012/0106404 A1 | 5/2012 | Damnjanovic | |
| 2012/0207038 A1* | 8/2012 | Choi | H04W 16/14 370/252 |
| 2012/0207067 A1 | 8/2012 | Malladi et al. | |
| 2013/0100903 A1* | 4/2013 | Pajukoski | H04L 1/0606 370/329 |
| 2013/0196664 A1* | 8/2013 | Yiu | H04W 72/0493 455/436 |
| 2014/0064067 A1* | 3/2014 | Drewes | H04L 5/0044 370/230 |
| 2014/0098780 A1* | 4/2014 | Kim | H04J 11/0023 370/329 |

OTHER PUBLICATIONS

3GPP R1-083655, Consideration on Relaying Frame Structure Design in LTE-A FDD Mode, LG Electronics, Sep. 2008, slide 16.
Application of the TDD underlay concept to home nodeB scenario. Vehicular Technology Conference 2008. VTC Spring 2008. IEEE 2008. Bharucha, Z., Harald H., Dec. 15, 2008.
Capacity analysis of TDD cell sharing underutilized FDD uplink. Vehicular Technology Conference 2001. VTC 2001 Spring. IEEE VTS 53d. vol. 4. IEEE 2001. Kim,D.H., Pyeong J. S., Chung G.K. Dec. 31, 2001.
Demand Responsive Resource Management for Cellular Networks. Link Asymmetry, Pricing and Multihopping Lindstrom,M. Apr. 29, 2005 http://www.diva-portal.org/smash/get/diva2:7804/FULLTEXT01.pdf Section 3.3.
International Application #PCT/IB2013/059481 Search Report dated Mar. 18, 2014.
3GPP TS 36.300 V11.3.0 (Sep. 2012); 3GPP; TSG RAN; E-UTRA and E-UTRAN; Overall description; Stage 2 (Release 11).
3GPP TS 36.300 V11.7.0 (Sep. 2013); 3GPP; TSG RAN; E-UTRA and E-UTRAN; Overall description; Stage 2 (Release 11), Annex J.
3GPP TR 36.932 V12.1.0 (Mar. 2013); 3GPP; TSG RAN; Scenarios and requirements for small cell enhancements for E-UTRA and E-UTRAN (Release 12), Section 6.
3GPP TS 36.211 V11.1.0 (Dec. 2012), 3GPP; TSG Radio Access Network;Evolved Universal Terrestrial Radio Access (E-UTRA); Physical Channels and Modulation (Release 11).
3GPP TS 36.213 V11.2.0 (Feb. 2013); 3GPP; TSG RAN; E-UTRA; Physical layer procedures (Release 11) Section 7.3.
3GPP TS 36.101 V11.1.0 (Jun. 2012); 3GPP; TSG RAN; E-UTRA; User Equipment (UE) radio transmission and reception (Release 11).
3GPP TS 36.104 V11.1.0 (Jul. 2012); 3GPP; TSG RAN; E-UTRA; Base Station (BS) radio transmission and reception (Release 11).

* cited by examiner

UTILIZATION OF THE UPLINK FDD CHANNEL

CROSS-REFERENCE TO RELATED APPLICATIONS

This application claims priority from Israeli patent application No. 222597, entitled "Improved Utilisation of the Uplink FDD Channel," filed on Oct. 21, 2012, and U.S. provisional patent application No. 61/882,792, entitled "Dual Connectivity and Carrier Aggregation Based on Traffic Asymmetry," filed on Sep. 26, 2013, which are incorporated herein by reference in their entirety.

FIELD OF THE INVENTION

The present invention relates generally to digital communication and more specifically to cellular communications.

1 BACKGROUND

Most of the spectrum used for cellular operation is allocated in a paired way, i.e. two FDD (frequency division duplex) equal-size frequency channels, one used for downlink (DL) transmission from a BS (Base Station) to wireless User Equipments (UE), and the other used for uplink (UL) transmission from the UE to the BS. Due to smart phone use, user traffic has become more and more asymmetrical, i.e. most of the traffic is downlink-centric, due to applications such as video streaming, file sharing and internet browsing.

The average ratio between the DL and UL traffic can reach, according to an Ericsson Mobility Report, Nov. 2012, up to 9:1 (10% overall). This asymmetry means, considering that the DL spectral efficiency is 1.5 times higher than the UL spectral efficiency, that only about 15% of the uplink channel spectrum is actually used. Even with a less aggressive asymmetry factor, such as 4:1, less than 40% of the available uplink channel is used. The total available time-frequency resources in the uplink channel spectrum may thus be 60-85% of the uplink channel bandwidth. A number of solutions combining FDD with time-domain duplexing (TDD) have been proposed. For example, U.S. application Ser. No. 13/286,209 "FDD and TDD carrier aggregation" relates to the carrier aggregation of FDD and TDD component carriers, where each carrier occupies its own frequency channels for operation.

U.S. application Ser. No. 13/208,213 "Backward compatible LTE system design for asymmetric uplink/downlink spectrum" considers a system which operates with multiple DL spectrum blocks and one up-link spectrum block.

U.S. Pat. No. 6,859,655B2 "TDD FDD Air interface" relates to the adaptation of two TDD systems such to operate on a FDD (paired) allocation.

U.S. patent application Ser. No. 12/777,945 "Dual mode radio for frequency division duplexing and time division duplexing communication modes" describes a FDD-TDD multiplexed frame structure.

U.S. Pat. No. 7,929,468, "Method for improving coexistence between adjacent TDD and FDD wireless networks" by the same inventor, refers to FDD and TDD use by equipment operating in separate adjacent frequency channels or adjacent frequency bands.

2 BRIEF SUMMARY

Some embodiments of the present invention that are described hereinbelow provide a cost-effective method for increasing uplink frequency channel use and thus increasing its spectral efficiency.

There is therefore provided, in accordance with an embodiment of the present invention, a method for communication, which includes communicating over the air with user equipment (UE) in a frequency domain duplexing (FDD) mode, which defines a downlink channel including a first set of time-frequency resources in a first frequency range and an uplink channel including a second set of time-frequency resources in a second frequency range, which is disjoint from the first frequency range. An excess capacity is identified in the uplink channel. At least a portion of the excess capacity is allocated for downlink communication by assigning a subset of the time-frequency resources in the second frequency range to the downlink communication. The method includes communicating over the air with at least one UE by transmitting downlink information using the assigned subset of the time-frequency resources in the second frequency range.

Allocating the excess capacity may include allocating a sub-range of the second frequency range for the downlink communication and/or allocating first time periods for FDD uplink communication and second time periods for the downlink communication within the second frequency range.

In some embodiments, a first base station communicates over the air with the UE in the FDD mode, and allocating at least a portion of the excess capacity includes assigning the subset of the time-frequency resources to a second base station, in a vicinity of the first base station. In one embodiment, the first base station is a macro base station, and the second base station is a small base station operating within a coverage area of the macro base station. Typically, allocating at least a portion of the excess capacity includes exchanging communications between the first and second base stations or between each base station and a provisioning entity in order to define an assignment of the time-frequency resources in the second frequency range.

In some embodiments, communicating over the air includes communicating with the at least one UE in a time domain duplexing (TDD) mode using the assigned subset of the time-frequency resources. In a disclosed embodiment, communicating in the TDD mode includes detecting an overlap between a first subframe that is assigned for the FDD uplink communication with a first base station and a second subframe that is assigned for TDD uplink communication with a second base station, and inhibiting uplink transmission within at least one of the first and second subframes.

Additionally or alternatively, assigning the subset of the time-frequency resources includes selecting respective time-frequency resource blocks for use in FDD uplink communication and in the TDD communication so as to minimize an interference between the FDD uplink communication and the TDD communication. Selecting the respective time-frequency resource blocks may include scheduling downlink transmissions in the TDD mode so as to minimize the interference due to uplink acknowledgments transmitted by the at least one UE at a predetermined time delay following the downlink transmissions.

In one embodiment, communicating with the at least one UE includes communicating with a given UE concurrently in both the FDD mode and by transmitting the downlink information using the assigned subset of the time-frequency resources in the second frequency range.

There is also provided, in accordance with an embodiment of the present invention, communication apparatus, including at least one radio, which is configured to communicate over the air with user equipment (UE) in a frequency domain duplexing (FDD) mode, which defines a downlink channel including a first set of time-frequency resources in a first frequency range and an uplink channel including a second set of time-frequency resources in a second frequency range, which is disjoint from the first frequency range. A control block is configured to identify an excess capacity in the uplink channel and to allocate a least a portion of the excess capacity for downlink communication by assigning a subset of the time-frequency resources in the second frequency range to the downlink communication, so as to enable the downlink communication to be carried out over the air with at least one UE by transmitting downlink information using the assigned subset of the time-frequency resources in the second frequency range.

There is additionally provided, in accordance with an embodiment of the present invention, communication apparatus, which includes at least one radio, which is configured to communicate over the air with user equipment (UE) in a time domain duplexing (TDD) mode in a first frequency range and to receive uplink communications from the UE in a frequency domain duplexing (FDD) mode in a second frequency range, which is disjoint from the first frequency range. A control block is configured to combine uplink signals received by the at least one radio in the TDD and FDD modes so as to receive aggregated information transmitted by the UE.

Still another embodiment provides communication apparatus, including at least one radio, which is configured to communicate over the air with at least one base station using a frequency channel initially defined for a frequency domain duplexing (FDD) mode, which defines a downlink channel including a first set of time-frequency resources in a first frequency range and an uplink channel comprising a second set of time-frequency resources in a second frequency range, which is disjoint from the first frequency range. Communicating with the base station includes a reception operation using a subset of the second set of time-frequency resources identified as excess capacity. A signal processing block is configured to acquire synchronization with the at least one base station in a time domain duplexing (TDD) mode, in which the at least one base station transmits downlink information using the subset of the second set of time-frequency resources identified as excess capacity. A control block is configured to read system information transmitted by the at least one base station in the TDD mode so as to enable downlink communication to be carried out over the air with the at least one base station in the TDD mode.

Additionally, the communication apparatus can be configured to receive both the downlink communication in the first frequency range in the FDD mode and downlink information transmitted using the assigned subset of the time-frequency resources in the second frequency range.

3 BRIEF DESCRIPTION OF THE DRAWINGS

For a better understanding of embodiments of the invention and for showing how the different embodiments may be carried into effect, reference will now be made, purely by way of example, to the accompanying drawings in which like numerals designate corresponding elements.

In the accompanying drawings:

FIG. 1—Represents an example of LTE uplink physical channel allocation.

Figure 2:
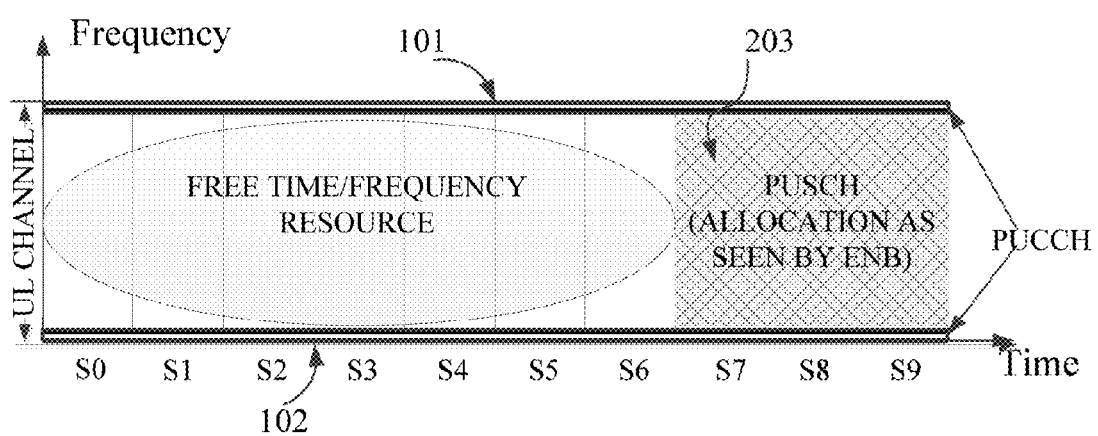

FIG. 2—Represents another example of LTE uplink physical channel allocation.

Figure 3:
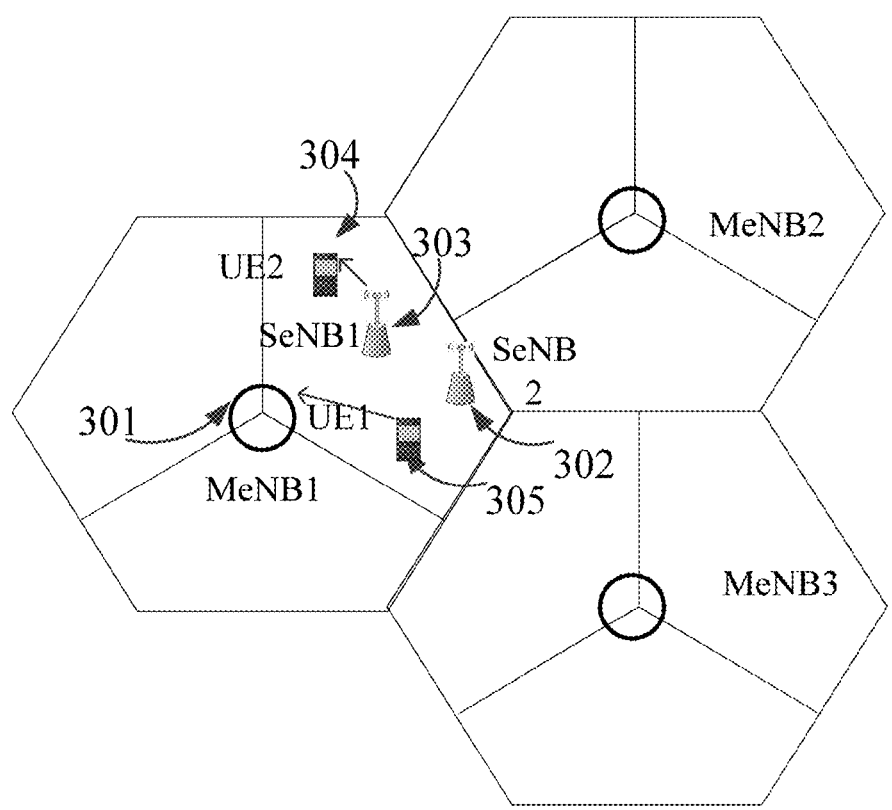

FIG. 3—Represents a deployment example of a heterogeneous network.

Figure 4:
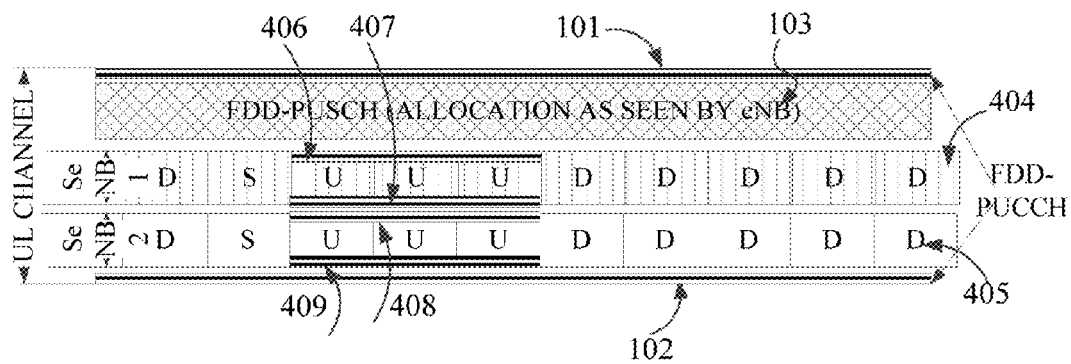

FIG. 4—Represents an example of time-resource allocation for two TDD systems within an uplink FDD frame.

Figure 5:
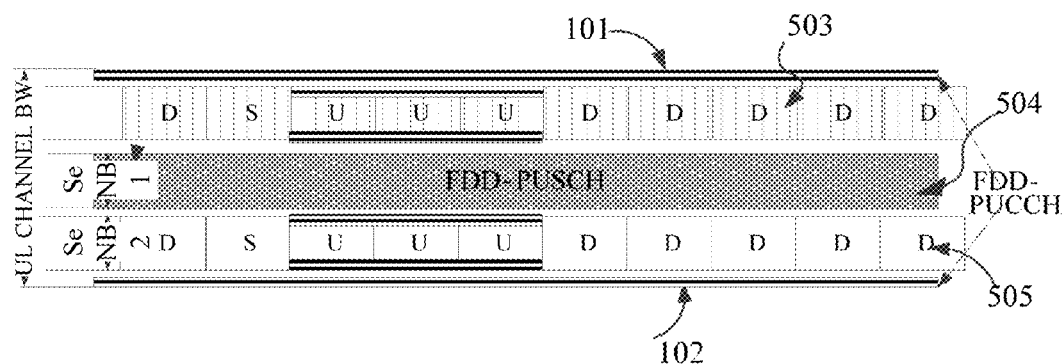

FIG. 5—Represents another example of time-resource allocation for two TDD systems within an uplink FDD frame.

Figure 6:
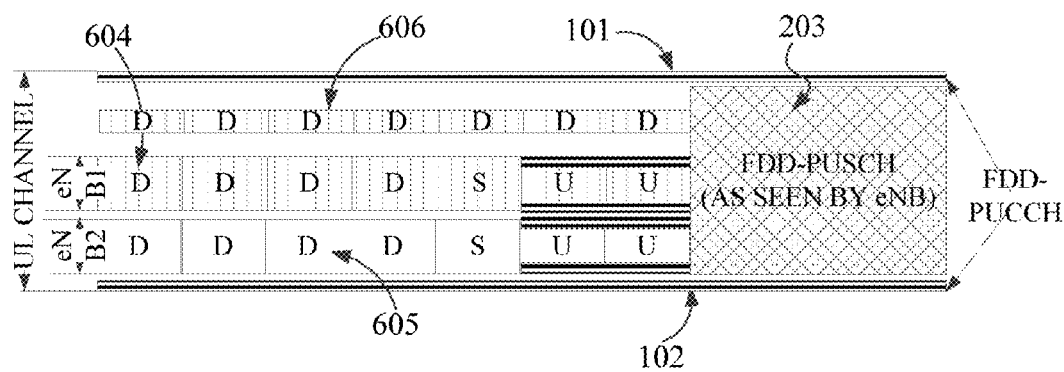

FIG. 6—Represents an allocation example for one DL-only system and two TDD systems within an uplink FDD frame.

Figure 7:
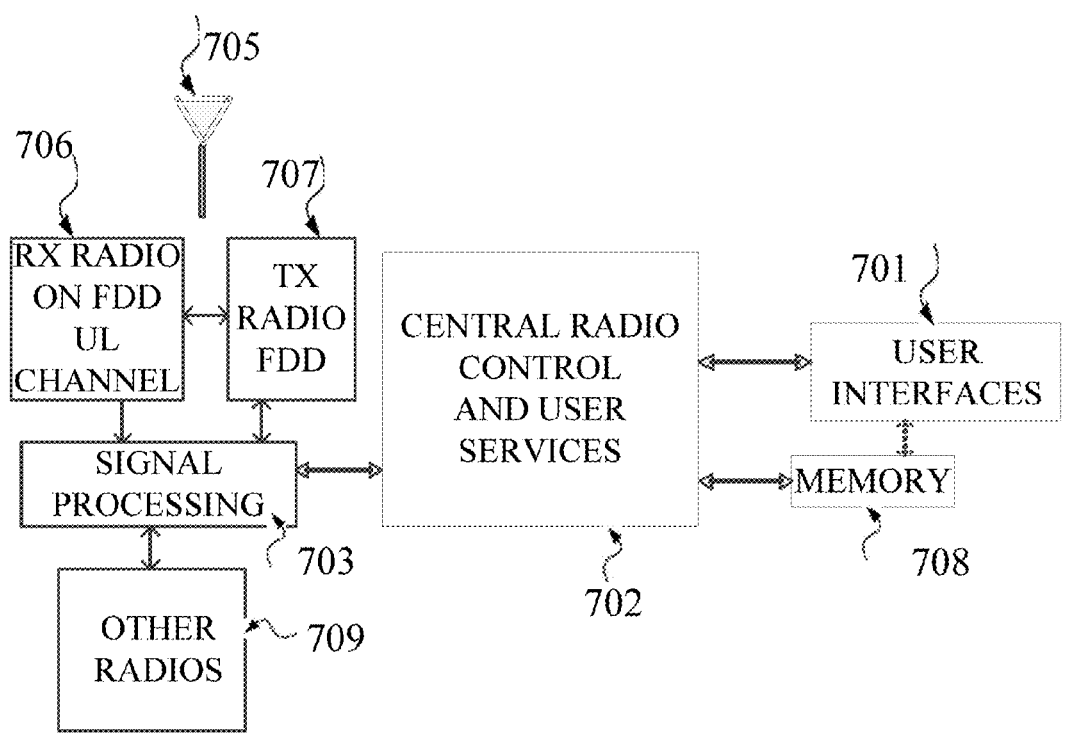

FIG. 7—Represents the UE internal architecture.

Figure 8:
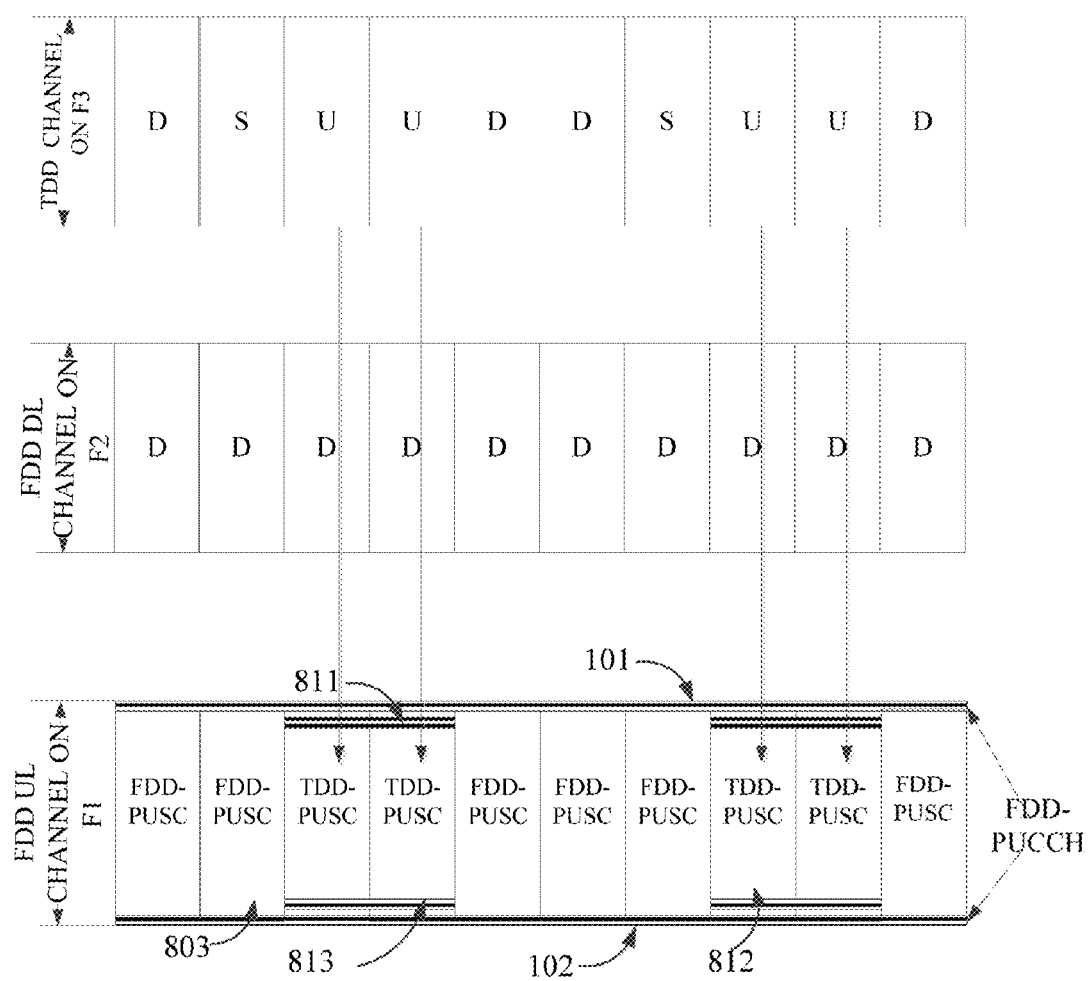
Figure 9:
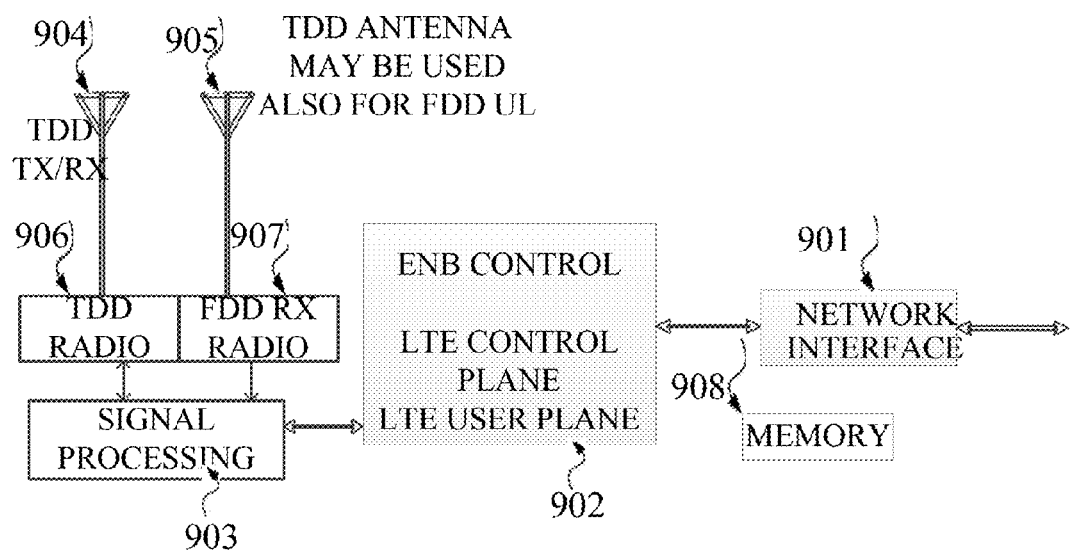
Figure 10:
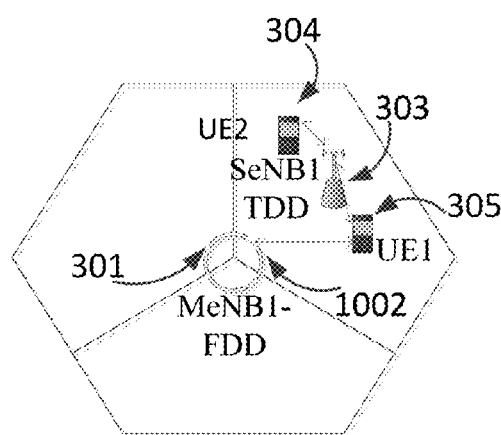
Figure 11:
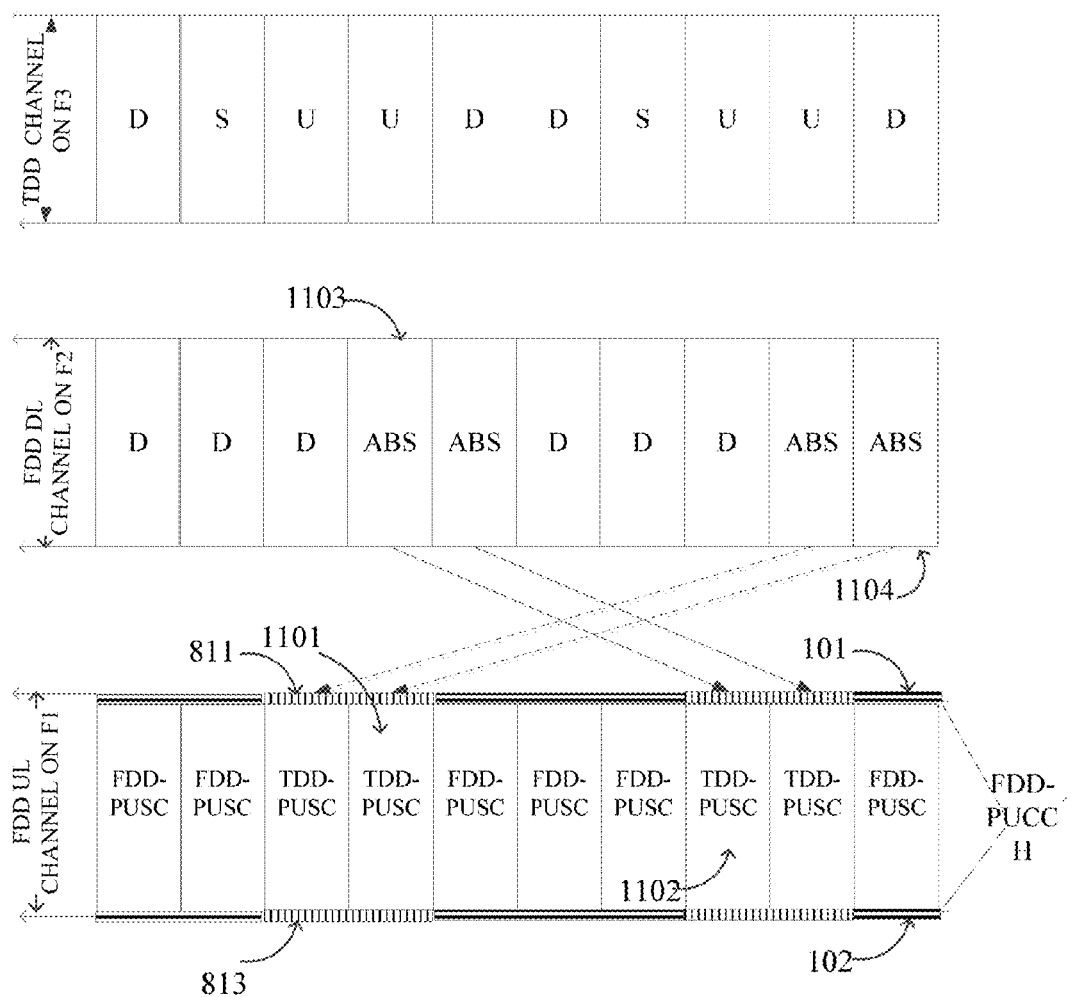
Figure 12:
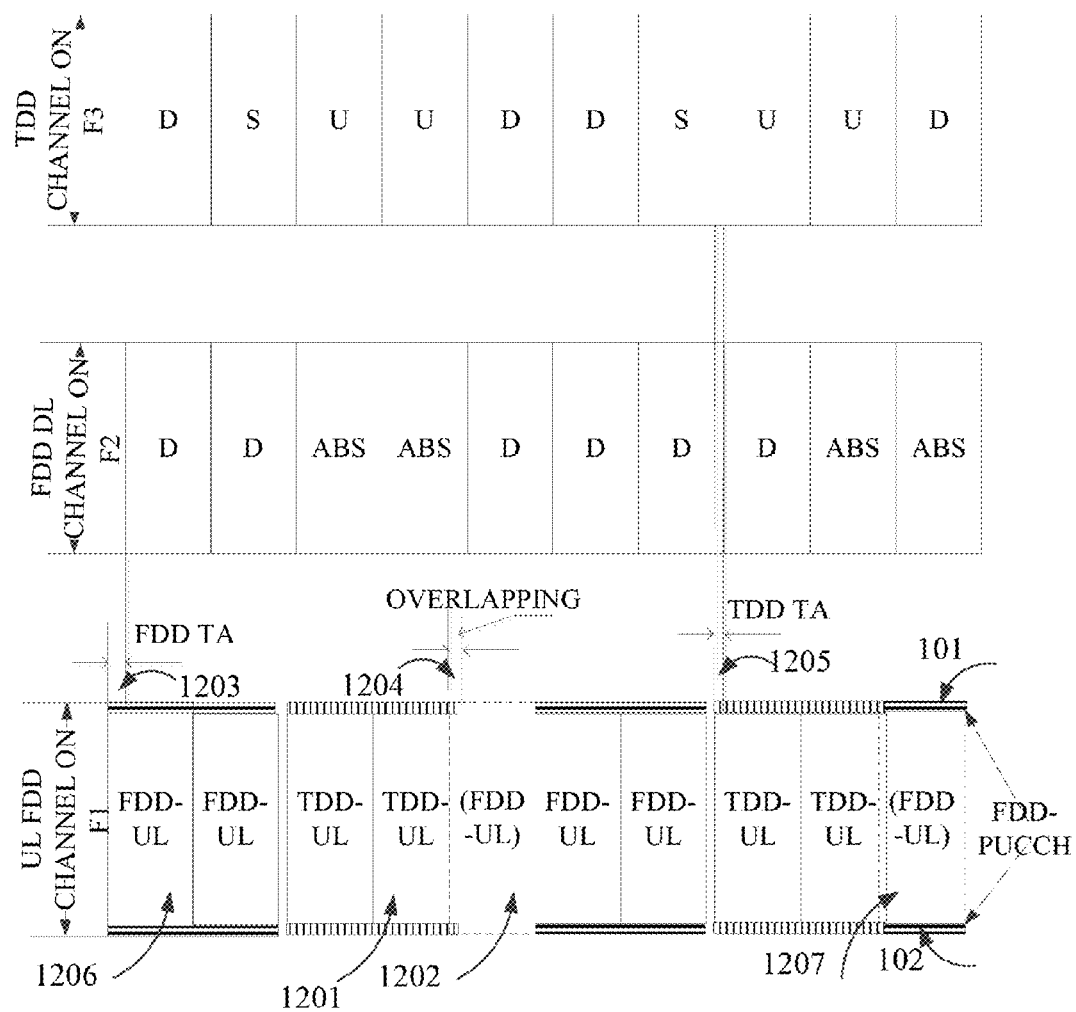
Figure 13:
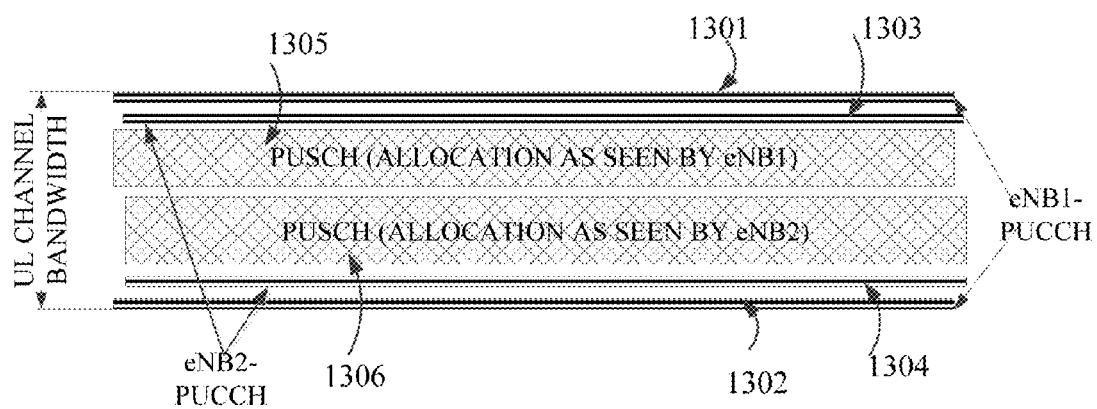

FIG. 8—Represents an example of LTE uplink multiplexed physical channels in conjunction with the DL TDD frame structure;

FIG. 9—Represents a modified TDD base station;

FIG. 10—Represents a deployment example of a heterogeneous FDD and TDD network;

FIG. 11—Represents an example of time-resource allocation in a downlink frame of an FDD base station for avoiding FDD operation in specific subframes;

FIG. 12—Illustrates multiplexed uplink subframes with different Time Advance Groups; and FIG. 13—Represents an allocation example for two base stations multiplexed in the frequency domain.

4 DETAILED DESCRIPTION

For the sake of simplicity and clarity, the following description uses a terminology that will be familiar to those skilled in wireless networks and in particular in LTE and WiMAX technologies. This terminology should not be considered as a limitation for the general applicability of the invention, as the extension of the principles embodied in the description to other types of networks will be apparent to those skilled in the art and is considered to be within the scope of the present invention.

The term "User Equipment" indicates a device either connected over the air to a Base Station (BS) or able to communicate with another device of the same type. The UE may be used by a person or involved in machine-type applications, such as sensors, TV surveillance, etc.

The term "incumbent BS" is used to indicate a cell deployed in FDD mode which, in embodiments of this invention, makes room for the operation of other new cells on its uplink frequency channel(s).

Although the embodiments described below refer, for simplicity, only to centralized or point-to-multipoint wireless systems, the principles of the invention may also be applied to mesh or multipoint to multipoint wireless systems.

Some embodiments of the present invention consider the fact that a UE (User Equipment) that is compatible with LTE Release 8 could transmit within all available subframes of the UL frequency channel, in order to provide ACK/NACK feedback on the PUCCH (Physical Uplink Control Channel) related to the reception of the DL transmitted data. ACK/NACK transmission in LTE is described for example in 3GPP TS 36.213 Release 11, section 7.3.

Embodiments of the present invention are designed to provide backward compatibility with UEs compatible with LTE Rel. 8, but the principles of these embodiments are applicable to all FDD wireless systems, using technologies such as HSPA, WiMAX (IEEE 802.16), microwave P-P (point-to-point) and P-MP (point to multipoint) and evolutions of these technologies.

As well known to those skilled in the art, the LTE FDD UL frame is composed of ten subframes, on which are mapped the physical channels. The PUCCH (Physical Uplink Control Channel) and the corresponding DM-RS (demodulation reference signals), considered herein as part of the PUCCH, are mapped on the equivalent Physical Resource Blocks (180 kHz/PRB) at the channel edge. The PUCCH contains the UCI (Uplink Control Information) and its transmission comprises the ACK/NACK, scheduling request, and periodic CQI feedback. Uplink data is transmitted within the PUSCH (Physical Uplink Shared Channel), expanding over a continuous frequency allocation equivalent to an integer number of PRBs. PUSCH may also include uplink control information.

FIG. 1 shows an example of the usage of an uplink FDD allocation by an LTE system. FIG. 1 and the following Figures show the PUCCH and PUSCH (Physical Uplink Shared Channel) as time-frequency resource allocations as seen by an eNB (LTE base station). The PUCCH (101 and 102) is mapped to the resource blocks at the channel edge, while in this example the allocation 103 of the PUSCH expands across the frequency domain, being present in all the available time resources.

For example, if we consider a 10 MHz frequency channel composed of 50 PRBs, the extreme two PRBs on each side could be reserved for PUCCH, while ⅓ of the remaining ones, i.e. 15 PRBs could be reserved for PDSCH. Such an allocation is suitable for an average traffic asymmetry of 1:4 (UL:DL).

The rest of the 31 PRBs across the channel bandwidth are in fact a "free time-frequency resource". Reserving the PUSCH near one of the PUCCH allocations, as shown in the figure, makes continuous room for the other usage of the available time-frequency resources, such as TDD.

It should be noted that a specific FDD LTE UE will send the PUCCH with UCI containing ACK/NACK in the subframe i+4 relative to the DL subframe i, in which the eNB (base station) has sent DL data to the specific UE. UCI, including ACK/NACK, can also be sent on the PUSCH. A UE compatible with LTE Release 8 and Release 9 cannot send the PUSCH and the PUCCH in the same subframe.

A good scheduling practice is the allocation of the PUSCH resources towards the center of the band, where the high power UE transmissions should be scheduled in order to reduce the OOB (out of band) emissions into the adjacent channels.

FIG. 2 depicts an uplink frame where the user traffic (PUSCH-203) is scheduled in the frequency and time domains in a way that makes resources available for TDD. The PUCCH, however—101 and 102—has still to be reserved at the channel edge.

The FDD UL frequency channel is only partially used, as the UL traffic is taking place only in the latest subframes in the frame (203). Given the operation of half-duplex terminals, which cannot receive and transmit at the same time, and also due to the importance of the DL subframes 0 and 5 carrying synchronization and control channels (Physical Broadcast Channel carrying the Master Information Block (MIB), it is preferable to allocate the PUSCH in the last subframes of the frame.

However, due to the fact that legacy UEs use the PUCCH for transmitting control information, including ACK/NACK feedback for the DL information transmitted four subframes previously, it is important to implement this invention so as to avoid interference with these PRBs.

Note that for use of the free time-frequency resource as shown in FIG. 2 by wireless entities not belonging to the main FDD cell, there is a need for time synchronization between such entities and the frames of the incumbent FDD base station.

Of course the allocation of the used resource block could be more flexible, for example by using non-contiguous subframes or by using partial channel occupancy in contiguous or non-contiguous subframes.

Embodiments relating to usage of the available time-frequency resources within the uplink channel are described further hereinbelow.

FDD-TDD Operation in the Same FDD Up-Link Channel

The first application at hand is TDD operation within the available time-frequency resources of one or more FDD systems. The interference created by TDD systems to FDD systems and vice versa is problematic and typically requires at least a reduction of the transmission powers and assessment of the out-of-band emissions. The reduced power transmission is suitable for small cells, such as pico-cells or femto-cells, wherein both base station (eNB) operation and UE operation are at lower powers due to the reduced cell size.

Let's consider the deployment scenario in FIG. 3; in the coverage area of a macro BS 301 (MeNB1) are deployed small base stations SeNB1-302 and SeNB2-303. A user device 305 (UE1) communicates with MeNB1, while UE2-304 communicates with the SeNB1-303. Each MeNB operates on three directional sectors. Each sector may use the entire bandwidth of the concatenated three sectors (either Reuse 1 or Carrier Aggregation) or may apply a policy of having each sector use different frequency channels. When the entire spectrum is used by each sector, based on FFR (Fractional Frequency Reuse), ICIC (Inter-Cell Interference Coordination) or eICIC (Evolved Inter Cell Interference Coordination), interference mitigation procedures may still be applied to avoid high transmission powers within the same frequency resource by adjacent sectors (eNB) in the same BS or by interfering eNBs. The effect of this policy will be that the scheduling of the occupied time-frequency resources by the interfering transmitters will be different between different eNBs.

In one embodiment of this invention, the up-link free time-frequency resource is used by the small eNBs. An example of such usage, derived from FIG. 1, is shown in FIG. 4. The incumbent FDD system has the reserved frequency allocations 101 and 102 for PUCCH and 103 for the PUSCH. TDD base station SeNB1 uses the frequency resources within the channel indicated by 404, and SeNB2 uses the frequency resources within the channel indicated by 405. The TDD downlink subframes are those noted "D", the TDD uplink subframes are noted "U," and the TDD special subframe is noted "S". PUCCH allocations for UEs served by SeNB1 are indicated by 406 and 407, while PUCCH allocations for UEs served by SeNB2 are indicated by 408 and 409.

FIG. 5 presents an allocation for the TDD systems derived from the free time-frequency resource presented in FIG. 1, but with the PUSCH of the FDD system placed in the center of the band. The incumbent FDD system has the reserved frequency allocations 101 and 102 for PUCCH and 504 for PUSCH. Each TDD system uses the frequency resources indicated by 503 and respectively 505.

FIG. 6 presents an allocation derived from FIG. 2 for one DL-only system-606 and two TDD systems, occupying the available frequency resources 604 and 605 for a number of subframes not occupied by the incumbent FDD PUSCH allocation 203.

An example of the design of the PRB allocations for each of the FDD and TDD systems in FIG. 4 is shown in Table 1:

TABLE 1

|  | MeNB FDD | SeNB1 TDD | SeNB2 TDD |
|---|---|---|---|
| Channel BW(MHz) | 10 | 3 | 3 |
| Resource blocks | 50 | 15 | 15 |
| RBs for PUCCH | 6 | 2 | 2 |
| RBs for PUSCH | 11 | 13 | 13 |
| Spare PRBs to be used for guard-bands |  | 3 |  |
| PRB*Slots for UL | 170 | 45 | 45 |
| PRB*slots for DL (TDD "S" subframe was considered as DL) | 500 | 105 | 105 |

In-Band FDD-TDD Interference Coordination

Strict coordination of the scheduling of transmit and receive operations in the UL frequency band can contribute to mitigation of interference.

Such coordination is based on identification of the interfering FDD UEs into the TDD receive operation and the scheduling of the respective transmissions and/or receptions so as to avoid interference.

The scheduling may involve using different subframes for transmission and reception.

Another interference mitigation technique, including for FDD-TDD PRB reuse in both TDD and FDD base stations, can be based on the knowledge regarding the UE position in each of the FDD and TDD cells.

In the case of interference created by UL transmission of a UE served by the FDD eNB to a second UE receiving the DL signal from a TDD base station, the relevant parameter is the distance between the interfering UE and the interfered UE. The distance can be obtained by assessing the UE position using techniques as GPS, Galileo, Baidu or similar satellite-based positioning, or by radio-based position assessment, as specified in standards and using positioning reference signals.

In the case of interference created by a TDD base station, transmitting on the UL FDD frequency channel, to a FDD base station receiving the signal from a served UE, as long as the quality of the received signal from the served UE at the FDD base station allows suitable reception of the UE signals, it is possible to reuse the PRBs in both base stations.

In the case of interference created by a UE served by the FDD base station to the TDD base station receiving a signal from a second UE, again it is possible to identify the UE and schedule it in another subframe so as to avoid interference.

In some situations the scheduling will affect the DL transmissions rather than the UL transmissions. For example, for avoiding interference created by the uplink operation of a UE on PUCCH, the scheduling of the downlink transmissions, causing UL transmission of that UE four subframes later, should be modified.

Such modified DL scheduling may involve the scheduling of the DL transmissions in another subframe or the insertion of ABS (muted) DL subframes; there is no need for ACK, because no DL data was transmitted, so that no UE will send ACK/NACK four subframes later or when established by the standards in case of TDD.

Another possibility is interference alignment or CS/CB (Coordinated Scheduling/Beamforming): Data is available only at the serving cell (data transmission from that point), but user scheduling/beamforming decisions are made with coordination among cells corresponding to the CoMP (coordinated multi-point) cooperating set.

If the TDD and the FDD small cells are part of a UL CoMP set, implementing joint reception and/or coordinated scheduling, for example by using Remote Radio Heads controlled by the macro eNB as center of the small cell, some overlap may be possible between the PRBs used by the FDD macro cell and the TDD small cells for UL transmissions.

Intra-Channel Interference

In the section below we will first analyze, with respect to interference created to an adjacent channel, the possibility of operation of two TDD additional cells within the free UL FDD channel resource.

Instead of a full coexistence study, considering the path loss between the interferer and the victim, we will just analyze the difference between the out-of band (OOB) emissions of a regular FDD UE and the OOB emissions of the TDD BSs and TDD UEs. By this analysis it will be possible to assess whether the emissions of the TDD systems into the FDD system are at the same level with the emissions of UEs deployed on an adjacent FDD channel.

The emissions of the FDD system into the TDD system are considered as PUCCH emissions, which cannot be higher than the UE emissions operating over the entire FDD band, or PUSCH emissions, which cannot be higher than the transmissions of an UE within a similar transmission bandwidth.

We will assess the intra-system interference based on the masks for 3 MHz systems. In fact, our two TDD systems and the PUSCH of the FDD system behave as three systems with a 3 MHz channel bandwidth. If we divide the 3 MHz by the PRB width (180 kHz), we obtain 16.6 RBs, while the occupied BW is only 15 PRBs. This means that at each edge of the channel there is an unused frequency of 0.8 PRBs, while in our design the spare frequency is a full PRB.

Based on the UE masks in 3GPP TS 36.101 and 3GPP TS 36.104, Table 2 presents the transmitted power density at the edge of the channel.

TABLE 2

| | Intra-channel emissions | | |
|---|---|---|---|
| $\Delta f_{OOB}$ (MHz) | UE-10 MHz, FDD PUCCH only (used as reference) | UE-3 MHz (TDD UE, FDD PUSCH on 3 MHz) | TDD Local area BS, 3 MHz |
| ±0-1 | −18 dBm/30 kHz | −13 dBm/30 kHz | −25 dBm/100 kHz = −30 dBm/30 kHz |
| ±1-2.5 | −10 dBm/MHz | −10 dBm/MHz | −10 dBm/MHz |
| 2.8-5 MHz | −10 dBm/MHz | −10 dBm/MHz | −25 dBm/MHz |
| 5-6 MHz | −13 dBm/MHz | −25 dBm/MHz | −25 dBm/MHz |
| Conclusion: | FDD interference = reference | OOB transmissions higher only for 0-1 MHz OOB offset | SeNB interference equal or significantly lower than the FDD UE reference |

The conclusion of Table 2 is that the small power eNB will create interference similar or significantly lower relative to that created by a regular UE.

From Table 2 it can be concluded that the co-channel problematic situations are:

1. OOB emissions created by the TDD UE to the PUSCH of the FDD channel.
2. OOB emissions created by the PUCCH to the adjacent TDD system.

Possible solutions to these cases may be:

A. Higher guard bands between the TDD UL transmissions and the PUSCH, eventually only in the subframes in which there are high power UL transmissions.

B. Placement of the high-power TDD transmissions in the center of the occupied band.

C. Reducing the activity and/or the power over the PUCCH of the FDD system. The power reduction can be achieved by appropriate scheduling of the DL transmissions towards the remote UEs, such that the ACK/NACK will be transmitted when PUSCH is active and not within PUCCH, or by mapping the PRBs used for PUCCH without frequency hopping.

Such scheduling takes into consideration that remote UEs will transmit the ACK/NACK with higher power, in response to DL transmissions that occurred four subframes earlier. So at least for one UL FDD subframe overlapping the TDD DL and another UL FDD subframe overlapping the TDD UL, the FDD eNB scheduling of DL transmissions taking place four subframes in advance should target lower-power communication with near-placed UEs. This approach enables the FDD BS to control the transmitted power by the respective UE to be significantly lower and thus will reduce the interference of the FDD PUCCH in the TDD subframes. Such low-power transmission is similar to the definition of the power transmission in the ABS (Almost Blank Subframes), where the transmitted power can be also reduced to zero.

Interference Outside the UL FDD Channel

Adjacent-channel interference in the FDD uplink spectrum is created by UE transmissions. Some embodiments of the present invention provide for DL transmission by a TDD base station or an additional DL-only transmitter. Operators using the adjacent UL FDD channel could experience interference created by such downlink transmissions in the UL FDD channel at a level similar to that caused by the interference created by UE transmissions.

The adjacent channel interference is also reflected by the LTE ACLR (Adjacent Channel Leakage Ratio), with values of 30 dB for regular UE and 45 dB for eNB (see 3GPP TS 101 and 3GPP TS 104).

The 15 dB difference in ACLR can accommodate the TDD low-power eNB higher antenna gain and its higher activity factor, such that the interference experienced due to DL transmissions will be at the same level as that experienced from UL transmissions.

UL-Intensive Applications

The UL-intensive applications that could be accommodated within the free UL spectrum are, for example, video surveillance and sensor networks, having a pronounced uplink activity factor. For such applications TDD small cells can be used. (LTE frame type 2, configuration 0, has four DL subframes and six UL subframes, because the S-subframe is mostly a DL subframe.)

The FDD small cell will occupy for its uplink operation the free part of the UL channel (FIG. 1 or FIG. 2 or their combination). Additional considerations are:

A. Its DL channel should be placed such that the duplex spacing is preserved;

B. Its channel size may be lower than the incumbent FDD channel;

C. For avoiding inter-cell interference, the right ICIC (inter-cell interference coordination) or eICIC (evolved ICIC, using ABS—almost-blank subframes) should be implemented.

Additional DL Traffic

With the carrier-aggregation (CA) concept it is possible to use the free UL spectrum as additional DL frequency resources. When the additional DL cell is collocated with the main cell, the DL transmissions of the secondary cell should be separated in the time domain from the uplink transmissions of the primary incumbent FDD cell, for avoiding in-device coexistence problems. In other words, it is possible to use an arrangement similar to that in FIG. 2, with the additional restriction that for a specific UE there are no transmissions on PUCCH during the DL transmissions of the secondary cell. Such a condition can be achieved with accumulated ACK/NACKs scheduled only in the non-interfering subframes or by using subframes in which no ACK/NACK is expected.

The downlink-only traffic can be unicast or broadcast.

FIG. 6 represents an additional DL channel 606, which uses the UL free spectrum together with two TDD systems.

Additional interference mitigation factors can be one or more of the following:

A. Larger guard-bands between PUCCH and the DL transmissions, such that the interference will be caused by the second adjacent channel.

B. Usage, for the additional DL transmission, of an antenna well isolated from the FDD primary transmission. For example, if the primary transmission is in Sector 1 of a tri-sector BS, the additional DL for Sector 2 can be mapped within the frequency channel transmitted by Sector 1 and vice-versa. Based on the OOB transmission limits for macro eNBs, a −65 dB antenna isolation reduces the interference of the additional DL into the UL reception to −94 dBm.

C. Interference cancellation at the BS, by subtracting the interference created by the transmitted signal, known at the BS, from the received signal.

D. Scheduling the DL transmissions in the main FDD cell and controlling the PDCCH power so that the PUCCH will be received during the secondary DL subframes at relatively high power.

Spectrum Resource Flexibility

There are multiple reasons for having a flexible spectrum allocation policy for all the interacting systems: the FDD system, one or more TDD systems, and one or more additional DL resource. Such reasons may include variations of traffic, radio channel conditions, interferences, etc.

In LTE, the channel width of the system is transmitted on the downlink as part of the MIB (Master Information Block) information. However, not all the DL resources have to be used, making possible a number of means for interference mitigation, such as the transmission of PRBs with no data or reduced power data, MBSFN (Multimedia Broadcast Single Frequency Network) subframes with no data, ABS (Almost Blank Subframes) without data, and ABS subframes with low-power data.

These variations allow the actual time-frequency resources occupied by the DL transmissions of the cells and the power of these transmissions to vary in time, contributing to similar variations in the UL direction.

Interference measurements combined with messages between the eNBs sharing the uplink channel may contribute to the coordination of spectrum use and transmitted powers in different subframes and resource blocks of the uplink frame.

The size of the UL free time-frequency resource may vary in time also depending on the variable UL traffic amount, channel conditions, etc.

Also in uplink it is possible to modulate (in a similar mode with the DL) the occupied time-frequency resource, by making available time-frequency resources of the TDD and/or of the downlink only and/or of the uplink-intensive transmissions for the operation of the incumbent FDD UE data transmissions in certain subframes.

UE Architecture for Same UL Channel FDD-TDD Carrier Aggregation and Dual Connectivity Some embodiments of the present invention provide Carrier Aggregation (CA) between the FDD carrier, operating on the FDD DL channel and FDD UL channel, and the TDD carrier, operating on the FDD UL channel.

A UE implementing such operation has a cost advantage over using CA for channel frequencies in different radio bands, such as 2.6 GHz and 3.5 GHz, as both FDD and TDD uplink in the same band can be supported with no need for a separate radio filter or a separate radio amplifier.

When TDD operation is added to the regular FDD operation on the uplink FDD channel for the same UE, an additional receiver radio chain is needed within the UE, as in FDD-TDD carrier aggregation or Dual Connectivity.

FIG. 7 shows the resulting UE architecture. The central radio control, including the functions related to the User Plane and Control Plane as described in 3GPP TS 36.300 and radio activities, is located within a central processing unit 702, which may also perform other high-layer user services, including running applications.

The user interfaces, such as the display, speaker, and microphone, are located in a user interface block 701.

A memory block 708, containing RAM and non-volatile memory (FLASH or ROM) is used by the central processing unit 702 and depending on the actual UE implementation, may be used also by the user interfaces 701.

Digital signal processing is performed by a signal processing block 703 and can give services to the radios using FDD for communication, like radios 706 and 707, using licensed bands, which are highly relevant for this invention, and also to other radios—709, such as WiFi and Bluetooth, operating generally in license-exempt bands. A common antenna 705 can be used for receive (RX) and transmit (TX), while using diplexers or switches to connect it. If the receive and transmit radio frequencies are far from each other, however, different antennas may be used.

The presented radio architecture, excepting the RX chain 706, is similar to conventional UEs. The additional receive radio 706 may take advantage of the existing radio frequency synthesizers in radio 707, so as not to duplicate the entire radio chain.

Embodiments of this invention are well suited for dual connectivity, also known as multi-stream aggregation. A possible embodiment is the use of the incumbent FDD base station as Master eNB and the TDD base station, operating within the available channel resources, as Secondary eNB.

FDD-TDD Carrier Aggregation with Separate FDD and TDD Radio Bands

In the following section we consider that the Operator uses a frequency band either in FDD or TDD mode, deploying a different base station for each frequency band. The base stations can be collocated or can use Remote Radio Heads (Scenarios 1 . . . 4 in Annex J of 3GPP TS 36.300 V11.7.0 (2013-09)) or can be non-collocated, as in the Small Cell Scenarios in 3GPP TR 36.934.

In these scenarios, TDD and FDD operations take place in a specific frequency band for each duplex mode, and the UE transmissions are sent using different radio channels for each FDD or TDD band, or by fast switching of the UE transmitter between these bands.

For example, TDD operation may take place in the 3.5 GHz band while the FDD operation takes place in the 2.5 GHz band, wherein 2.5-2.57 GHz is used for uplink.

These embodiments are compatible with the following carrier aggregation concepts provided by 3GPP TS 36.300 Release 11: "In Carrier Aggregation (CA), two or more Component Carriers (CCs) are aggregated in order to support wider transmission bandwidths up to 100 MHz. A UE may simultaneously receive or transmit on one or multiple CCs depending on its capabilities:

A UE with single timing advance capability for CA can simultaneously receive and/or transmit on multiple CCs corresponding to multiple serving cells sharing the same timing advance (multiple serving cells grouped in one TAG);

A UE with multiple timing advance capability for CA can simultaneously receive and/or transmit on multiple CCs corresponding to multiple serving cells with different timing advances (multiple serving cells grouped in multiple TAGs). E-UTRAN ensures that each TAG contains at least one serving cell;

A non-CA capable UE can receive on a single CC and transmit on a single CC corresponding to one serving cell only (one serving cell in one TAG).

CA is supported for both contiguous and non-contiguous CCs with each CC limited to a maximum of 110 Resource Blocks in the frequency domain using the Rel-8/9 numerology."

The phrase "simultaneously receive or transmit" does not necessarily require the usage of the same subframe for CA operation.

In the case of FDD-TDD CA (Carrier Aggregation) or Dual Connectivity for communication systems enjoying maximum scheduling flexibility, two Rx (receive) radio chains and two transmit (Tx) radio chains are needed for each UE (user equipment) implementation. The reason is that in CA and Dual Connectivity, FDD and TDD operations take place in different radio bands.

Given that a legacy UE typically supports only one Tx radio chain, a suitable method is needed for multiplexing transmissions towards two eNBs, each eNB operating in its own frequency channel and possibly using a different duplex mode.

For clarification, in FDD-TDD CA the operational frequency channels for FDD and TDD belong to different radio bands, while the UE communicates with collocated FDD or TDD cells or with non-collocated FDD or TDD cells created by RRH (Remote Radio Heads) linked to the same base station. In Dual Connectivity there are at least two base stations involved, and the MeNB (Master eNB) or the SeNB (Secondary eNB) may use different radio channels, belonging to the same or to different radio bands.

A possible solution for using only one Tx chain in uplink for each UE is fast switching of the radio channels, but this switching may result in long settling times and high spurious signals. Embodiments of the present invention provide a cost-effective method for overcoming these limitations, by exploiting the downlink-centric traffic asymmetry and the resulting low occupancy of the uplink channel.

In the section below we describe a solution for avoiding the switching of the UE uplink radio transmitter. This solution takes into account the free time-frequency resources on the uplink FDD channel.

The solution makes use of multiplexing of the transmissions to the different base stations while exploiting the free time-frequency resources of the FDD uplink channel.

FIG. 8 presents a TDD type 2 frame structure based on Configuration 1 in TS36.211 Release 11, operating on the frequency channel f3. The DL transmission of the FDD base station takes place on frequency channel f2. Multiplexed operation in the time domain of FDD and TDD uplink channels takes place on the FDD uplink frequency f1.

The main physical channels shown in FIG. 8 are as follows:
- PUSC—803 (physical uplink shared channel—referred to as PUSCH in LTE standards);
- PUCCH (physical uplink control channel) for FDD (101 and 102);
- PUCCH (811 and 813) for TDD;
- PUSCH (812), indicated as PUSC for TDD.

The time-frequency resources are allocated such to avoid contentions at receiver, i.e. the allocations should be orthogonal.

The exact usage of the subframes can be dynamically established based on the uplink traffic characteristics in each base station; however, a simpler provisioning approach can be also used.

Based on LTE SC-TDMA technology, a UE with a single RF Tx cannot transmit two different signals at the same time. Thus, FIG. 8 shows the aggregated channel usage as seen by the base station where the transmissions arrive from multiple UEs.

In order to achieve the multiplexing that is illustrated here, the TDD base station should be able to receive signals on the radio channel allocated for the FDD uplink transmission. When the FDD and TDD base stations are collocated, this condition can be achieved easily, at no additional cost; when the FDD base station is a macro base station, and the TDD base station is a small cell, there will be a cost increase in the TDD base station, as an additional Rx RF channel is added. This channel may include diversity or MIMO support, such that in practice it may use more than one radio chain.

The modified TDD Base Station radio architecture is shown in FIG. 9. In this figure the base station modules include a Network Interface—901, providing the data connection and a Base Station Control Block 902, including the LTE Control Plane and the LTE User Plane, which also transfers user data between the Network interface—901 and a Signal Processing unit—903, which in turn receives and transmits the baseband signals to the radios. In addition to a regular TDD radio 906 using an antenna 904, there is an FDD receive channel 907, which may use the TDD antenna 904 or a separate antenna 905, if the TDD antenna does not cover the frequency band of the UL FDD channel.

Both TDD and the FDD base stations receive the multiplexed signals of the physical channels for FDD and TDD operation and select the relevant physical channels for processing.

A Memory block 908, containing RAM and non-volatile memory (FLASH or ROM), is used by the eNB Control Unit 902 and depending on the actual eNB implementation, may be used also by the Network Interface 901.

Dual-Connectivity

In the case of dual connectivity, an UE can receive signals from two different base stations.

A deployment example is shown in FIG. 10. The FDD base station 301 is a macro base station having three sectors. Within the coverage area of a sector 1002 is deployed a small TDD base station 303. UE 304 is connected only to the TDD base station 303, while the UE 305 is connected to both base stations and is able to communicate with both in the same frame.

The multiplexing approach explained for CA is also suitable for Dual Connectivity, such that everything related to the multiplexing approach explained in the context of CA should be understood as also valid for dual connectivity.

Avoiding FDD PUCCH in TDD Subframes

Some relaxation of the coordination of the PRBs (Physical Resource Block) allocated for FDD and TDD operation in the uplink FDD channel can be obtained with suitable allocation of ABS (almost blank subframes) or even PRB muting. The ABS allocation should be such that there will be no need for FDD HARQ (Hybrid Automatic Repeat Request) or simply ACK/NACK in those subframes in which TDD operation takes place.

An example of ABS allocation, suitable for Type 2 LTE frame structure "configuration 1," is shown in FIG. 11.

As it can be observed, an FDD DL ABS (or a muted or MBSFN) subframe 1103 is placed four subframes in advance relative to a TDD UL subframe 1102. Given the frame repetition in time, an FDD DL ABS (or a muted or MBSFN) subframe 1104 is also four subframes in advance relative to a TDD UL subframe 1101.

If in subframes 1103 and 1104 is transmitted no data requiring ACK/NACK, there is no ultimate need to schedule the FDD PUCCH within the subframes 1101 and 1102.

Due to the resulting lack of contention between FDD PUCCH and the TDD UL subframe, the TDD UL subframe can occupy all the PRB resources of the subframe.

Time Advance

In some deployment cases, for example non-collocated TDD and FDD base stations or large difference between FDD and TDD frequency bands, the FDD and TDD transmissions may use different values of UL time advance. As a consequence, the UE could operate with time advances belonging to different Time Advance Groups (TAGs), and there may be so some overlapping between the UL subframes belonging to different TAGs.

A solution to this problem is shown in FIG. 12.

In the pictured scenario, the FDD frequency has a higher delay as compared with the TDD frequency, such that a time advance TA-1203 for FDD is higher than a TA-1205 for TDD. This difference creates a potential overlapping between the UL subframes 1201 and 1202, which can be resolved if no data is transmitted in the UL FDD subframe 1202. The same situation occurs in an FDD subframe 1207, and the same solution can be applied.

If the overlapping duration is low enough not to affect the receive operation at the base station, no corrective action is needed.

If the overlapping duration is too high, the UE transmissions that can create reception problems should be avoided.

In order to avoid undesirable transmissions, including PUCCH, more flexible transmission of the information elements included in the UCI is desirable, i.e. transmission of the UCI information elements (IE) should be flexible and programmable, instead of being restricted to the standard four-subframe delay.

The flexible scheduling of the frames in which the UCI IEs could be transmitted require a new provisioning or else better coordination from the higher layers using the Control Plane on the Uu (eNB to UE) interface.

Even if the TDD channel already supports more flexible ACK/NACK assignment and bundling, it is recommended to provide further flexibility in ACK/NACK scheduling.

In the scenario in which the TDD delay is higher than the FDD delay, the overlapping will take place in the subframes involving transition from FDD to TDD.

To avoid transmission during one of the overlapping subframes, a new message can be used to indicate in which UL subframe the ACK/NACK for a given downlink subframe should be transmitted.

In any case, it is desirable that the FDD and TDD base stations coordinate UL allocation of the time-frequency resources to FDD or TDD PUSCH, PUCCH and PRACH (physical random access channel), such that each base station will be able independently to schedule its traffic.

The inter-eNB coordination can take place on the inter-eNB X2 or Xn interface (the second is used only for dual connectivity), which may be enhanced with the information elements described above.

Different Channel Width for FDD and TDD

In general the channels used in TDD operation are wider than those used for FDD. This difference in the channel width implies that uplink transmissions should use different channel widths when they are multiplexed on an FDD UL channel, and it may be necessary to switch the channel filters within the UE Tx radio module as function of the channel width per subframe.

TDD or FDD Carrier Aggregation in Uplink

For the aggregation of the uplink FDD-only or TDD-only carriers, a UE should use only the relevant subframes, as assigned to each UE for each duplex mode.

The Pcell (primary cell, carrying control and eventually data information) and Scell (secondary cell, carrying data and eventually control information) can be assigned on any of the aggregated carriers.

Variable DL:UL Traffic Asymmetry on Different Component Carriers

Each component carrier can use a different traffic asymmetry. In TDD this asymmetry may be reflected in different Frame configurations for DL and UL subframes. In both FDD and TDD, the number of subframes actually used for the uplink traffic may differ between the component carriers.

The FDD base station, based on the DL-UL configuration information provided by the TDD base station, will allocate its UL subframes so as to allow the multiplexing of the TDD subframes within its UL frequency channel.

UE Transmission Power

Due to the different propagation paths between some component carriers or due to other scheduling considerations, the UE transmission power may be different on each component carrier, creating potential interference problem between the component carriers.

When such a problem appears, it is possible to mitigate it by scheduling UEs operating on different component carriers but using similar transmitting powers in the same subframe.

To support the above scheduling method, base stations should exchange information regarding power allocation per PRB or per subband in a specific UL subframe and eventually include in the exchanged information the specific UE ID.

A base station knowing the power allocation of the other base station will be able to correctly schedule the UEs in order to minimize the inter-carrier interference.

Resource Split in Frequency Domain

The resource split between the two base stations can take place in the time domain, as illustrated above. This approach requires synchronization between base stations.

Another possible approach is to make the resource split in the frequency domain, with each base station using orthogonal PRBs or subbands. This approach will not require synchronization, but may be prone to reciprocal interference in case of dual connectivity.

This sort of operation is illustrated in FIG. 13, assuming that both base stations use the same channel width.

In this figure the PUCCHs of eNB1 and eNB2 are represented respectively by allocations 1301, 1302 and 1303 and 1304 within the same frequency channel, while the PUSCH is represented by the resource blocks 1305 and 1306.

Alternatively separate frequency channels can be used for each eNB.

When the channel widths are different, a more complicated resource multiplexing design is typically needed.

As in the other cases, the time-frequency resources for PUCCHs and PUSCHs should be exchanged between base stations.

UEs not Supporting Flexible ACK/NACK

A legacy UE may communicate with the FDD or TDD base stations in the legacy mode, with the condition that both DL and UL traffic scheduling by the respective eNB will provide operational conditions that will not require new UE capabilities.

For example, if the DL data transmission to these UEs occurs only in subframes in which the UL FDD ACK/NACK can be transmitted based on the four-subframe-delay rule for FDD or based on the ACK/NACK rules for TDD, there will be full compliance with the legacy FDD or TDD system.

UE-UE Communication

UE-UE communication will be probably carried out on the UL frequency channel of either the FDD or the TDD system. For this purpose, one of the UEs will have to quit its serving cell for the duration of the UE-UE communication.

By using features of the present invention, a UE served by an FDD base station can communicate with a UE served by a TDD base station while each UE remains connected to its own serving base station.

Traffic Asymmetry in FDD and TDD Cells

Traffic asymmetry can be different in FDD and TDD cells; for example the FDD cell can be configured for downlink-centric asymmetry, while the TDD cell can be used for cells transmitting machine-type communication or different events (sports events, shows, etc.) It is required that the TDD frame UL-DL configuration on each carrier will be exchanged with the FDD base station.

Multi-RAT (Radio Access Technology)

Embodiments of invention can use different technologies in the FDD and TDD base stations. For example the FDD base station can use HSDPA, while the TDD base station uses LTE.

The condition for such combined operation is that the TDD base station frame structure allows interleaving into the subframes made available by the FDD system or, even better, that the FDD base station, based on the DL-UL configuration information provided by the TDD base station, will allocate its UL subframes so as to allow the multiplexing of subframes transmitted in accordance with the other technology.

UE Behavior

To communicate with a TDD cell operating in an UL FDD frequency channel, the UE should be able, as a first step, to execute a cell search in that frequency channel, i.e., to acquire time and frequency synchronization with the TDD cell. In LTE this process uses the primary and secondary synchronization signals. The next steps are decoding of the system information contained in the Master Information Block and a number of System Information Blocks and connection to a serving cell.

For performing Carrier Aggregation, the UE should be able to change its behavior in the same radio frame, so as to support, depending on the operation mode:

A. Downlink reception in a TDD cell and uplink transmission in a FDD cell in the same radio frame and on the same radio channel.

B. Downlink reception and uplink transmission in a FDD carrier-aggregated mode.

C. Multiplexed uplink transmissions to different cells, which may be essentially FDD cells or a mix of FDD and TDD cells.

If the cells in the above description are not collocated, the same operation modes apply for dual Connectivity.

Messages

In order to coordinate inter-cell TDD-FDD interference for mixed-channel usage, it is desirable to enhance the LTE X2 messages (eNB-eNB) and/or the management messages and/or over-the-air eNB communications, by introducing information elements such as:

A. Request from a new eNB to the incumbent eNB to accept its cell operation within the UL frequency; possible parameters: each eNB identifier, requested bandwidth, requested number of subframes, DL:UL split, max. power, synchronization capabilities, pathloss information based on the DL reception.

B. Acceptance of the above request by the incumbent eNB, while indicating the allowed BW, max. power, allowed number of subframes, allowed DL:UL split, selection of synchronization mode.

C. Confirmation by the new eNB of the start of activity based on the present time or a specified future time, while indicating the eNB identifier, type of confirmation (Yes, No), start time information.

D. Request from an incumbent eNB to the new eNB to cease operation within its UL frequency or to change parameters of its operation, such as max. power, etc.; possible information: eNB identifiers, type of request, list of parameters and possibly preferred values.

E. Time offset between the start of the FDD frame of the incumbent eNB and the start of the TDD frame of the new eNB; possible information: eNB identifiers, time offset, how the time offset was determined.

F. Allocated UL subframe for D2D operation; possible information: identifier of the eNB making available such subframe, subframe number within the eNB frame.

G. TDD configuration used by the TDD eNB operating in the UL FDD band. Possible information: TDD eNB identifier, DL:UL configuration index, transmission power, frequency channel identifier.

H. Request from an eNB to the other eNB in CA or to the MeNB in dual connectivity to accept its partial or full operation within the UL frequency; possible parameters are: eNB identifier, bandwidth, requested number of subframes, synchronization capabilities, flexible PUCCH assignment support, preferred subframes indicators.

I. Acceptance of the above request by the incumbent eNB, while indicating its eNB identifier, the allowed BW, allowed number of subframes, acceptable subframe assignment, the PRBs assigned to the PUCCH in each subframe.

J. Confirmation by the new eNB of the start of activity at the present time or a specified future time.

K. Request from an incumbent eNB to the new eNB to cease operation within its UL frequency or to change parameters of its operation, such as subframe or PRB assignment.

L. Scheduling information per subframe and component carrier, including eNB identifier, subframe number, PRBs or subframes, used UE power, possibly UE identifier.

M. Scheduling information for flexible UCI IE, to be exchanged with UE over the Un interface (eNB to UE), especially ACK/NACK scheduling and over the eNB-eNB X2 or Xn interfaces.

N. DL-UL subframe allocation in the TDD base station, including eNB identifier and TDD frame configuration index.

O. UE could indicate to each base station the different time advances or the subframes in which overlapping may occur.

The resource allocation per subframe is not needed when the two base stations share the resources in frequency domain.

When the traffic characteristics change, the TDD base station may change the Configuration, as indicated in 3GPP TS 36.211 Release 11 for frame type 2. In such a case the TDD base station may request a change of resource allocation. The same configuration change may occur due to the changing percentage of UL traffic in the FDD or TDD base station. As a result, the entire resource allocation in the UL frame may be re-negotiated. It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for communication, comprising:
communicating over the air with user equipment (UE) in a frequency domain duplexing (FDD) mode, which defines a downlink channel comprising a first set of time-frequency resources in a first frequency range and an uplink channel comprising a second set of time-frequency resources, comprising multiple physical resource blocks (PRBs) in multiple time periods, in a second frequency range, which has two channel edges and is disjoint from the first frequency range;
identifying an excess capacity in the uplink channel;
allocating at least a portion of the excess capacity for downlink communication by assigning a subset of the time-frequency resources in the second frequency range to the downlink communication, wherein the subset does not comprise at least the PRBs at both of the channel edges in at least one of the time periods; and
communicating over the air with at least one UE by transmitting downlink information using the assigned subset of the time-frequency resources in the second frequency range.

2. The method according to claim 1, wherein allocating the excess capacity comprises allocating first time periods for FDD uplink communication and second time periods for the downlink communication within the second frequency range.

3. The method according to claim 1, wherein a first base station communicates over the air with the UE in the FDD mode, and wherein allocating at least a portion of the excess capacity comprises assigning the subset of the time-frequency resources to a second base station, in a vicinity of the first base station.

4. The method according to claim 3, wherein the first base station is a macro base station, and the second base station is a small base station operating within a coverage area of the macro base station.

5. The method according to claim 3, wherein allocating at least a portion of the excess capacity comprises exchanging communications between the first and second base stations or between each base station and a provisioning entity in order to define an assignment of the time-frequency resources in the second frequency range.

6. The method according to claim 1, wherein communicating over the air comprises communicating with the at least one UE in a time domain duplexing (TDD) mode using the assigned subset of the time-frequency resources.

7. The method according to claim 6, wherein communicating in the TDD mode comprises detecting an overlap between a first subframe that is assigned for the FDD uplink communication with a first base station and a second subframe that is assigned for TDD downlink communication with a second base station, and inhibiting uplink or downlink transmissions within at least one of the first and second subframes.

8. The method according to claim 6, wherein assigning the subset of the time-frequency resources comprises selecting respective time-frequency resources for use in FDD uplink communication and in the TDD communication so as to minimize an interference between the FDD uplink communication and the TDD communication.

9. The method according to claim 8, wherein selecting the respective time-frequency resource blocks comprises scheduling downlink transmissions in the TDD mode so as to minimize the interference due to uplink acknowledgments transmitted by the at least one UE at a predetermined time delay following the downlink transmissions.

10. The method according to claim 1, wherein communicating with the at least one UE comprises communicating with a given UE concurrently in the FDD mode and also by transmitting the downlink information using the assigned subset of the time-frequency resources in the second frequency range.

11. The method according to claim 1, wherein communicating with the given UE in the FDD mode and transmitting the downlink communication to the given UE are executed by different base stations.

12. Communication apparatus, comprising:
at least one radio, which is configured to communicate over the air with user equipment (UE) in a frequency domain duplexing (FDD) mode, which defines a downlink channel comprising a first set of time-frequency resources in a first frequency range and an uplink channel comprising a second set of time-frequency resources, comprising multiple physical resource blocks (PRBs) in multiple time periods, in a second frequency range, which has two channel edges and is disjoint from the first frequency range; and
a control block, which is configured to identify an excess capacity in the uplink channel and to allocate at least a portion of the excess capacity for downlink communication by assigning a subset of the time-frequency resources in the second frequency range to the downlink communication, wherein the subset does not comprise at least the PRBs at both of the channel edges in at least one of the time periods, so as to enable the downlink communication to be carried out over the air with at least one UE by transmitting downlink information using the assigned subset of the time-frequency resources in the second frequency range.

13. The apparatus according to claim 12, wherein the control block is configured to allocate first time periods for FDD uplink communication and second time periods for the downlink communication within the second frequency range.

14. The apparatus according to claim 12, wherein the at least one radio is embodied in a first base station, which communicates over the air with the UE in the FDD mode, and wherein the control block is configured to allocate the subset of the time-frequency resources to a second base station, in a vicinity of the first base station.

15. The apparatus according to claim 14, wherein the first base station is a macro base station, and the second base station is a small base station operating within a coverage area of the macro base station.

16. The apparatus according to claim 14, wherein the control block is configured to communicate with the second base station in order to define an assignment of the time-frequency resources in the second frequency range.

17. The apparatus according to claim 12, wherein the control block is configured to communicate with the at least one UE in a time domain duplexing (TDD) mode using the assigned subset of the time-frequency resources.

18. The apparatus according to claim 17, wherein the control block is configured to detect an overlap between a first subframe that is assigned for the FDD uplink communication with a first base station and a second subframe that is assigned for TDD downlink communication with a second base station, and to inhibit uplink transmission within at least one of the first subframes.

19. The apparatus according to claim 17, wherein the control block is configured to select respective time-frequency resource blocks for use in FDD uplink communication and in the TDD communication so as to minimize an interference between the FDD uplink communication and the TDD communication.

20. The apparatus according to claim 19, wherein the control block is configured to schedule downlink transmissions in the TDD mode so as to minimize the interference due to uplink acknowledgments transmitted by the at least one UE at a predetermined time delay following the downlink transmissions.

21. The apparatus according to claim 12, wherein the control block is configured to communicate with a given UE concurrently in both the FDD mode and by transmitting the downlink information using the assigned subset of the time-frequency resources in the second frequency range.

22. Communication apparatus, comprising:
at least one radio, which is configured to communicate over the air with at least one base station using a frequency channel initially defined for a frequency domain duplexing (FDD) mode, which defines a downlink channel comprising a first set of time-frequency resources in a first frequency range and an uplink channel comprising a second set of time-frequency resources, comprising multiple physical resource blocks (PRBs) in multiple time periods, in a second frequency range, which has two channel edges and is disjoint from the first frequency range, wherein communicating with the base station includes a reception operation using a subset of the second set of time-frequency resources identified as excess capacity;

a signal processing block, configured to acquire synchronization with the at least one base station in a time domain duplexing (TDD) mode or in a frequency domain duplexing (FDD) mode, in which the at least one base station transmits downlink information using the subset of the second set of time-frequency resources identified as excess capacity, wherein the subset does not comprise at least the PRBs at both of the channel edges in at least one of the time periods;

a control block, which is configured to read system information transmitted by the at least one base station in the TDD or FDD mode so as to enable downlink communication to be carried out over the air with the at least one base station in the TDD or FDD mode.

23. The apparatus according to claim 22, wherein the signal processing block is configured to receive both the downlink communication in the first frequency range in the FDD mode and the downlink information transmitted using the assigned subset of the time-frequency resources in the second frequency range.

24. The apparatus according to claim 23, wherein the signal processing block is configured to receive both the downlink communication in the first frequency range from a first base station in the FDD mode and the downlink information transmitted in the second frequency range by the first base station or by a different base station.

25. A system for communication, comprising:

at least one user equipment (UE); and a base station, which is configured to communicate over the air with the at least one user equipment (UE) in a frequency domain duplexing (FDD) mode, which defines a downlink channel comprising a first set of time-frequency resources in a first frequency range and an uplink channel comprising a second set of time-frequency resources, comprising multiple physical resource blocks (PRBs) in multiple time periods, in a second frequency range, which has two channel edges and is disjoint from the first frequency range, to identify an excess capacity in the uplink channel, to allocate at least a portion of the excess capacity for downlink communication by assigning a subset of the time-frequency resources in the second frequency range to the downlink communication, wherein the subset does not comprise at least the PRBs at both channel edges in at least one of the time periods and to communicate over the air with one or more of the at least one UE by transmitting downlink information using the assigned subset of the time-frequency resources in the second frequency range.

* * * * *